(12) United States Patent
McLeod

(10) Patent No.: US 7,487,731 B2
(45) Date of Patent: Feb. 10, 2009

(54) LIQUID-SOLIDS APPLICATOR WITH VALVE MEANS TO PERMIT CLEANING

(75) Inventor: Robert Archie McLeod, Woodstock (CA)

(73) Assignee: Holland Equipment Limited, Norwich, Ontario (CA)

( * ) Notice: Subject to any disclaimer, the term of this patent is extended or adjusted under 35 U.S.C. 154(b) by 377 days.

(21) Appl. No.: 11/360,429

(22) Filed: Feb. 24, 2006

(65) Prior Publication Data

US 2007/0199487 A1 Aug. 30, 2007

(51) Int. Cl.
*A01C 23/00* (2006.01)
(52) U.S. Cl. .................. 111/121; 111/127; 111/900
(58) Field of Classification Search ......... 111/118–129, 111/200, 900
See application file for complete search history.

(56) References Cited

U.S. PATENT DOCUMENTS 3,556,027 A * 1/1971 Ammann ................ 111/119
5,520,333 A * 5/1996 Tofte ...................... 239/10
6,772,840 B2 * 8/2004 Headworth ............... 166/302

* cited by examiner

*Primary Examiner*—Christopher J. Novosad
(74) *Attorney, Agent, or Firm*—Gowling Lafleur Henderson LLP; D. Doak Horne

(57) ABSTRACT

Apparatus for applying liquid-solid dispersions to soil. Valves are provided which permit cleaning. An elongate conduit, with an aperture at one end, and a first valve proximate such aperture may be opened to permit passage of a pig member. An upwardly extending conduit is "T"ed" off the elongate conduit, and connects with a manifold and a plurality of supply tubes to direct the liquid-solid dispersions to the soil at various points along the frame of the applicator. A second valve may be provided on the upwardly extending conduit, which may be closed to prevent initial supply of the liquid-solid dispersion to the apparatus and instead flow to the aperture to prevent plugging during initial operation. The second valve, when closed, further serves as an anti-siphoning valve to prohibit further supply of liquid solid dispersion to the manifold. A method for cleaning such apparatus is further disclosed.

21 Claims, 7 Drawing Sheets

LIQUID-SOLIDS APPLICATOR WITH VALVE MEANS TO PERMIT CLEANING

FIELD OF THE INVENTION

This invention relates to farm equipment, and in particular to an apparatus adapted for applying liquids or liquid-solid dispersions, such as liquid manure, to soil.

BACKGROUND OF THE INVENTION AND DESCRIPTION OF THE PRIOR ART

Various liquid or liquid solid dispersions, such as liquid manure from feedlot operations, milk by-products and wastes from dairy operations, biodegradable wastes from food processing plants, municipal bio-solids from sewage treatment plants, or commercially-available liquid fertilizers, are all valuable sources of nutrients for agricultural crops.

A number of prior art agricultural implements, such as the Aerway™ SSD* implement manufactured by Holland Equipment Ltd. of Norwich, Ontario Canada, exist for applying such liquid-solid dispersions to tracts of land to provide such valuable nutrients thereto.

Trade Mark of Holland Equipment Ltd., Norwich, Ontario

A dragline system is typically employed to provide the liquid-solid slurry to the implement for subsequent delivery to the soil. In this regard, a slurry in the form of a liquid-solid dispersion is typically pumped from a lagoon or stationary storage tank to the field by a piping system, where it is delivered to the implement via a flexible dragline. In the field the flexible dragline is coupled to the application implement, and the implement, while coupled to the flexible dragline, is pulled across the field by a tractor, typically in a serpentine fashion. The dragline supplies the liquid-solid dispersion to the implement for delivery to the soil.

The implement may spread the slurry in a broadcast manner on the surface of the soil, or more preferably apply the slurry in the cultivation path of the implement or along rows of live crop. Alternatively the implement may blend or bury the slurry in furrows or mix it with the soil during aeration or tillage of the soil.

The tractor, which tows the application implement, due to flexibility of the dragline, can follow a serpentine path in the field to give uniform coverage of the land while being operatively connected to the flexible dragline.

The flexible supply hose is typically of a plastic "pvc" type, or a woven flexible fabric material, and supplies the liquid solid dispersion to the applicator apparatus for subsequent application to the soil.

Problematically, however, the supply hose is typically initially in a dry condition and contains only air. Accordingly, where the pump commences supply of such liquid-solid dispersions from the lagoon to the apparatus via the supply hose, the interior of the supply hose will become wetted and thereby draws moisture from the supplied liquid-solid dispersion. The supply hose will continue to draw moisture and liquids from the liquid-solid dispersion being pumped until the interior periphery thereof is fully wetted along its entire length. This dehydration phenomenon of the initial portion of the supplied slurry is even more pronounced where the supply hose is of substantial length and/or of a fabric material which typically absorbs a portion of the liquid component of the pumped liquid-solid dispersion, as in the case of woven hose which continually absorbs water from the interior of such hose. As such absorption continues, in the case of supply hoses of woven fabric, the liquid evaporates from the exterior of the supply hose and is replaced by further liquid absorbed from the pumped slurry. Thus the initial portion of the liquid-solid dispersion which is pumped to the applicator apparatus will typically arrive at the apparatus in a dehydrated condition bereft of most liquid and moisture therein and thus as a fibrous solid mass, which typically results in initial plugging of the apparatus, particularly at the manifold and supply tubes, where the individual supply tubes, due to their smaller diameter relative to the diameter of the supply hose, are much more susceptible to plugging.

It would accordingly be greatly advantageous if an the applicator apparatus could be adapted to rid itself of the initially supplied liquid-solid dispersion to thereby avoid initial plugging of the supply tubes which typically occurs during wetting of the supply hose at intial start-up due to the above-described dehydration phenomenon.

Also problematically, liquid- solid dispersions which may have remained in the apparatus from a period of previous use (particularly where the apparatus is not configured to allow proper draining) will typically have lost a substantial portion of the liquid in such liquid- solid dispersion due to evaporation, leaving a fibrous solid material in the apparatus which need first be removed or cleaned from the apparatus before operation can be renewed.

Accordingly, it would further be advantageous if applicator apparatus could be designed and configured to permit drainage of liquid solid slurries after usage, and cleaning thereof after use or prior to re-use.

For lengthy supply hoses, particularly those of substantial length and of an absorbent fabric material, the interior periphery thereof will frequently become coated with solid matter due to the dehydration and wetting phenomenon described above. Such results in a restriction of the effective interior diameter through which such liquid-solid slurry need be pumped. Such restriction over time will reduce the volumetric flow rate of the supply hose and/or require substantially increased pressure to maintain equivalent volumetric flow rates and have the slurry reach the apparatus at an effective quantity and pressure to permit effective supply of such slurry to the soil. Accordingly, to ensure the supply hoses is operating with as little internal obstruction as possible, the interiors thereof need frequently be cleaned to maintain effective operability.

One means of preventing plugging of the supply hose, or to empty the hose of material upon completion of use to allow the hose to be rolled up for storage or transport, is the injection, via compressed air, of a pig member which is propelled through the supply hose via such compressed air, and which scrapes and removes adhered solids on the interior periphery of the supply hose which may cling to the interior side wall periphery of the supply hose.

It would accordingly be advantageous if such apparatus could further be adapted to permit passage of a pig member therethrough for cleaning purposes, which does not require the operator to stop the machine or disconnect the dragline hose.

In cases where non-fabric supply hose is used, which in contrast to flexible fabric hoses may be subject to a vacuum pressure, and where the applicator apparatus is at an elevation below that of the supply lagoon, undesirably even after cessation of the operation of the supply pump, liquid-solid dispersions may still continue to flow to the applicator apparatus due to the siphoning effect. Thus undesirably in such circumstances, even though an operator of a applicator apparatus may stop the apparatus in the field, supply of such liquid-solid dispersion to the applicator apparatus will continue due to the siphoning effect.

Accordingly, a real need further exists, in situations where siphoning may occur, for an applicator apparatus which can prevent siphoning and thus undesired continued flow of slurry to the soil via the applicator apparatus.

SUMMARY OF THE INVENTION

The present invention thus relates to an apparatus adapted for providing liquids or liquid- solid dispersions to soil, which in one embodiment, by virtue of its structure and arrangement of valve means, permits not only passage of a pig member therethrough for cleaning purposes which apparatus can thereafter, with little effort save manipulation of various switches from the cab of a tractor, commence operation, but further permits initially-supplied liquid solid dispersions to be ejected from the apparatus so as to thereby avoid initial plugging of the supply tubes which typically occurs during start-up due to the above-described dehydration phenomenon. Alternatively, such apparatus is adapted to allow, immediately after application of a liquid or solid-liquid dispersion to soil, cleaning thereof with mere manipulation of a valve from the cab of a tractor towing such apparatus.

The apparatus of the present invention in a preferred embodiment may also possess second valve means. In the embodiment of the invention wherein second valve means are provided, such not only prevents such liquid-solid dispersion from flowing to the manifold of the apparatus during a cleaning step, but further operates to prevent siphoning in situations where siphoning may occur and thus prevent unwanted application of liquid-solid dispersions by the apparatus at times when not desired.

Accordingly, the applicator apparatus of the present invention, in its various embodiments, which may each exist in the apparatus individually or may all be combined in a single apparatus, permits both cleaning of the apparatus by a pig member at the same time as cleaning of the supply hose, permits ejection of initial fibrous masses during initial start-up, prevents unintended siphoning, and may further be configured so as to best permit drainage of the apparatus after use.

Accordingly, in a first broad embodiment of the invention, the present invention provides for an apparatus for applying a liquid or a liquid-solid dispersion to soil when passed over said soil, comprising:

an elongate substantially linear conduit having a distal and a proximal end, adapted at said distal end for releasable coupling to a supply hose for receiving supply of a liquid or liquid- solid dispersion, and having at said proximal end an aperture;

first valve means, situate at said proximal end of said conduit means, adapted to permit egress of said liquid or liquid-solid dispersion via said aperture when said first valve means is opened;

an outwardly extending conduit, one end thereof in fluid communication with and fluidly coupled to said elongate conduit intermediate said proximal and distal end thereof; and at another end in fluid communication with a manifold member;

a plurality of supply tubes, each in fluid communication at one end thereof with said manifold member and at another end thereof adapted to supply said liquid or liquid-solid dispersion to soil; and wherein said first valve means may be opened to permit passage of an initial portion of said liquid or liquid-solid dispersion through said elongate conduit from said distal end to said proximal end and egress thereof via said aperture; and wherein said first valve means may thereafter be closed to permit said liquid or liquid-solid dispersion to thereafter be supplied from said elongate conduit to said outwardly extending conduit and thereafter to said manifold member for subsequent delivery to said soil when said apparatus is passed over said soil.

In such first embodiment, the pig member contemplated for use in the cleaning operation is substantially cylindrical of length "l" and having an outer diameter approximately equal to or slightly less than the inner diameter of the supply hose. Due to the pig member being substantially linear, the pigment member will tend to travel (when forced into the distal end of the elongate conduit via the usual means of compressed air) the length of the elongate conduit through to the proximal end, at the same time pushing in front of it and removing from the inner peripheral walls of the tube any adhered solid matter. Upon reaching the proximal end of the conduit, the collected solid matter and the pig member itself, will pass through the first valve means and be ejected from the elongate conduit via the aperture therein. The pig member does not travel into the upwardly extending conduit, as such would require the pig member to bend in order to travel into the upwardly extending conduit which typically extends radially upwardly from the elongate conduit. The pig member, being linear and relatively inflexible, is thus only able to travel in relatively linear paths and is thus advantageously prevented from being pushed into said outwardly-extending conduit and is instead forced along the length of the elongate linear conduit. No second valve means to prevent travel of the pig member into the outwardly-extending conduit is thus required, although such second valve means could, if the pig member was of a short length, be provided to perform such function.

The pigging operation may be carried out prior to commencement of operation of the apparatus to apply such liquid-solid dispersions to the soil, or more preferably immediately after completion of operation of such device, to effectively purge such apparatus of all slurry which may remain therein.

In a second embodiment, a second valve is further provided. This second valve is situate in said outwardly-extending conduit proximate said one end thereof, for preventing, when closed, ingress of said liquid-solid dispersion to said manifold member, and when opened, permitting flow of said liquid or liquid-solid dispersion to said manifold member.

Advantageously, in a second embodiment of the invention having a further second valve, such second valve allows an alternative or additional "cleaning" step to be performed at initial start-up of the apparatus, and operates synergistically and in tandem with said first valve during such further or alternative cleaning step. Such valves are preferably of the remote control type, capable of being remotely controlled from the cab of the towing tractor. Specifically, upon initial supply of slurry to the apparatus via the supply hose, said first valve means may be opened and said second valve means may be closed to permit an initial portion of said liquid or liquid-solid dispersion to be passed through said elongate conduit from said distal end to said proximal end and ejected via said aperture. Such second valve thus prevents any of the initial injected slurry, which due to the dehydration phenomena described above has become essentially a dehydrated solid mass, from being forced into the outwardly extending conduit and thence to the manifold and thereafter to the supply tubes, which would become blocked if such occurred. Instead, the first valve means is opened, and the initial fibrous mass is permitted to be ejected from the elongate conduit via the first valve means and said aperture. Thereafter, after such cleaning operation, the first valve means is closed, and the second valve means is opened, to permit said liquid or liquid-solid dispersion to be supplied from said elongate conduit to said outwardly extending conduit and thereafter to said manifold member for delivery to said soil when said apparatus is passed over said soil.

The embodiment of the invention having two value means has a further advantage when repositioning the apparatus in the field. In this regard, when repositioning prior art apparatus in the field having the serpentine hose connected thereto, such soft hose would typically "kink". Kinks need to be resolved before flow can be re-established. Advantageously, with the apparatus of the present design having two valve means, namely a first valve means (dry start/clean out valve) and the second valve means (anti-siphon/line pressure), and both are closed, such then permits the pump supplying the liquid-solid dispersion in the hose to maintain the hose under pressure. This pressure keeps the supply hose firmly inflated to thereby minimizing twist and kink. Application of material is resumed when the second valve means (anti-siphon/line pressure valve) is opened.

The present invention further comprises a method of cleaning an apparatus as described above, said method comprising the steps of:
(i) opening said first valve means so as to allow egress of matter from said aperture;
(ii) forcing said pig member through said elongate conduit from said distal end to said proximal end; and
(iii) ejecting said pig member from said apparatus via said aperture.

In a further embodiment of the invention, where the apparatus further comprises a second valve means, the invention further comprises a method of cleaning said apparatus, comprising the steps of:
(i) closing said second valve means;
(ii) opening said first valve means;
(iii) forcing said pig member through said elongate conduit from said distal end to said proximal end and to be ejected from said apparatus via said aperture;
(iv) opening said second valve means and closing said first valve means; and
(v) allowing compressed air supplied to said conduit to flow into said manifold member and thereafter to said supply tubes so as to eject from said apparatus any remaining liquid or liquid-solid dispersion.

In yet a further embodiment wherein the apparatus comprises two valve means, the invention comprises a method of operating said apparatus, comprising the steps of:
(i) closing said second valve means;
(ii) opening said first valve means;
(iii) directing an initial liquid or liquid/solid dispersion through said elongate conduit from said distal end thereof to said proximal end;
(iv) ejecting an initial portion of said dispersion from said elongate conduit via said aperture;
(v) closing said first valve means and opening said second valve means; and
(vi) permitting said liquid or liquid-solid dispersion to pass through said second valve means and thereafter to said manifold of said apparatus.

Advantageously, the second valve performs a further function. Specifically, in instances where potential siphoning from the supply lagoon may exist, or in the case where a towed elevated storage tank is used and where gravity may cause continued supply of liquid or liquid-solid dispersions to the apparatus, the second valve means performs the further function of preventing, when closed, continued supply of liquid or liquid solid dispersions to the apparatus and thence to the soil, which would be undesirable in the case where the apparatus is temporarily stopped, idled, or parked.

In the preferred embodiments, the first valve and the second valve are automated valves, being either hydraulically, electrically, or solenoid operated valves, and are coupleable to the towing tractor's electrical or hydraulic system, and are actuatable from the cab of the towing tractor. In a preferred embodiment, at least the second valve, and preferably the first valve, are each biased in a closed position when in a non-activated state, so as to be in a closed position in the event of failure of the source of actuation, such as the tractor hydraulics or tractor electrical system.

In a preferred embodiment of the invention, the first valve means is adapted to allow passage therethrough and ejection of the pig member from the proximal end of the elongate conduit, thus advantageously allowing two different alternative types of cleaning steps to be conducted, as described above.

In an alternative (third) embodiment of the invention utilizing only a first valve, the apparatus of the present invention may further be configured so as to provide drainage of the apparatus when not in use, to avoid the problem of residual solid masses remaining in the apparatus after evaporation of the liquid in the liquid-solid dispersion. Specifically, in such further refinement the elongate conduit is situated proximate the soil, and may be inclined, with the outwardly extending conduit extending radially outwardly and upwardly therefrom to a raised and elevated manifold member. Upon cessation of operation, or disconnection of the supply hose from the distal end of the elongate conduit, any remaining slurry in the manifold will drain out via the supply tubes, and any remaining slurry in the outwardly extending conduit or elongate conduit will be permitted to drain downwardly and out of the apparatus via the proximal or distal end of the elongate conduit. To drain from the proximal end the first valve need be opened, and the conduit inclined downwardly towards the proximal end. To drain from the distal end, the supply hose need preferably be removed and the elongate conduit inclined downwardly at its distal end.

Accordingly, in such refinement of the first embodiment, the apparatus of the present invention comprises:
an elongate substantially linear conduit, located low in the apparatus and proximate said soil over which said apparatus is passed, having a distal and a proximal end, adapted at said distal end for releasable coupling to a supply hose for receiving said liquid or liquid-solid dispersion, and having at said proximal end an aperture;
first valve means, situate close to said proximal end of said elongate conduit, adapted to permit egress of a pig member via said aperture when said first valve means is opened;
an outwardly and upwardly extending conduit, one lower end thereof in fluid communication with and fluidly coupled to said elongate conduit intermediate said proximal and distal end thereof; and at another raised end in fluid communication with an elevated manifold member;
a plurality of supply tubes, each in fluid communication at one raised end thereof with said manifold member and at another lower end thereof situate proximate said soil and adapted to supply said liquid or liquid-solid dispersion to said soil; and
wherein said first valve means may be opened to permit passage of said pig member through said elongate conduit from said distal end to said proximal end and to be ejected via said aperture; and
wherein said first valve means may thereafter be closed to permit said liquid or liquid-solid dispersion to be supplied from said elongate conduit to said outwardly extending conduit and thereafter to said manifold member for delivery to said soil when said apparatus is passed over said soil.

Likewise, the drainage feature allowing drainage of the liquid solid dispersion remaining in the apparatus when operation has ceased may likewise be incorporated into the second embodiment of the invention. Accordingly, in this further refinement of the second embodiment of apparatus of the present invention, such apparatus comprises:

an elongate, substantially linear conduit (preferably inclined to further assist drainage), located low in the apparatus and proximate said soil over which said apparatus is passed, having a distal and a proximal end, adapted at said distal end for releasable coupling to a supply hose for receiving said liquid or liquid-solid dispersion, and having at said proximal end an aperture;

first valve means, situate close to said proximal end of said elongate conduit, adapted to permit egress of said liquid or liquid-solid dispersion via said aperture when said first valve means is opened;

an outwardly and upwardly extending conduit, one lower end thereof in fluid communication with and fluidly coupled to said elongate conduit intermediate said proximal and distal end thereof; and at another elevated end in fluid communication with an elevated manifold member;

a plurality of supply tubes, each in fluid communication at one raised end thereof with said manifold member and at another end thereof situate proximate said soil and adapted to supply said liquid or liquid-solid dispersion to said soil; and second valve means, situate in said outwardly extending conduit for preventing, when closed, ingress or egress of said liquid or liquid-solid dispersion to or from said manifold member, and when opened, permitting flow of said liquid or liquid-solid dispersion to said elevated manifold member;

wherein said first valve means may be opened and said second valve means may be closed to permit an initial portion of said liquid or liquid-solid dispersion to be passed through said elongate conduit from said distal end to said proximal end and ejected via said aperture; and wherein said first valve means may thereafter be closed and said second valve means opened to permit said liquid or liquid-solid dispersion to be supplied from said elongate conduit to said outwardly extending conduit and thereafter to said manifold member for delivery to said soil when said apparatus is passed over said soil.

In preferred embodiments of each of the above embodiments, either said elongate conduit or said outwardly extending conduit further possess pressure relief valve means to prevent over-pressurization of said manifold member and said supply hoses. In one embodiment, said pressure relief valve means is situate on said elongate conduit so as to relieve said supply tubes of excess pressure in the event said elongate conduit is in a state of over-pressurization.

In still a further refinement of the apparatus of the present invention having a pressure relief valve, the pressure relief valve is integrated into one or other of the first or second valves, and preferably the first valve, and excess pressurized slurry may thus be ejected from the apparatus via the aperture in the elongate conduit. Deflector plates, such as clamshell deflectors, may further be provided to deflect pressurized slurry exiting such pressure relief valve or said aperture.

In a final embodiment of the invention, all of the above features are incorporated into a single apparatus. Thus in the preferred embodiment the apparatus comprises both a first and a second valve, each either hydraulically or electrically actuated, with the first valve further permitting passage of a pig member. The elongate conduit employed is substantially linear to accommodate passage of a cylindrical pig therethough, and is further inclined, to permit drainage. The outwardly extending conduit which extends from the elongate conduit is arranged to extend upwardly to a raised manifold, likewise to assist in drainage of the apparatus upon cessation of operation. A pressure relief valve is situated on the elongate conduit, and deflector plates positioned at the pressure relief valve.

BRIEF DESCRIPTION OF THE DRAWINGS

Further advantages and permutations will appear from the following detailed description of various non-limiting embodiments of the invention, taken together with the accompanying drawings, in which.

DETAILED DESCRIPTION OF SOME PREFERRED EMBODIMENTS

Figure 1:
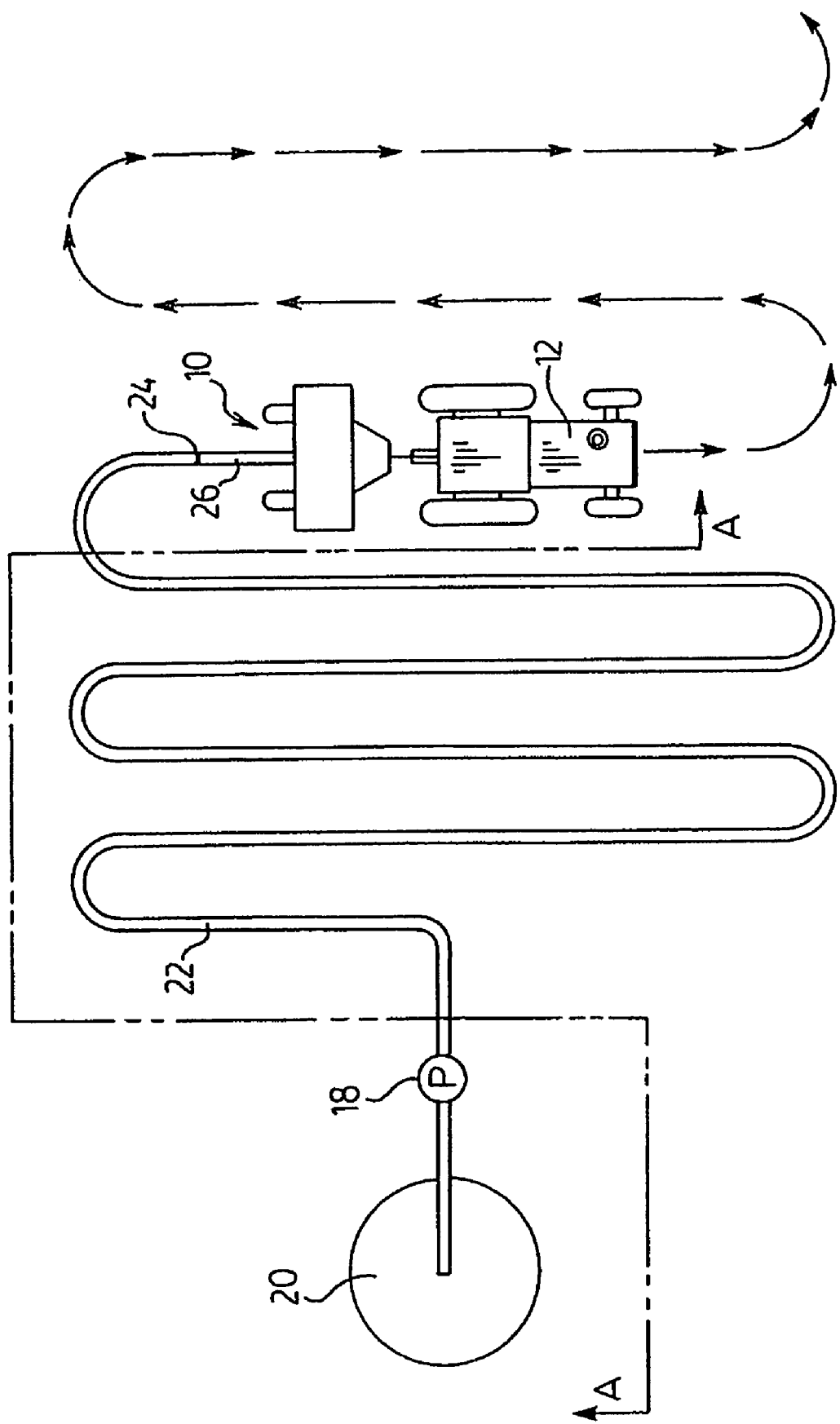
FIG. 1 is a schematic view of the apparatus of the present invention, showing the manner of implementation of the apparatus as a liquid-solids applicator, which may be towed by and attached to a three-point hitch of a tractor.

In all figures, for consistency, identical components are identified with identical reference numerals.

Figure 2:
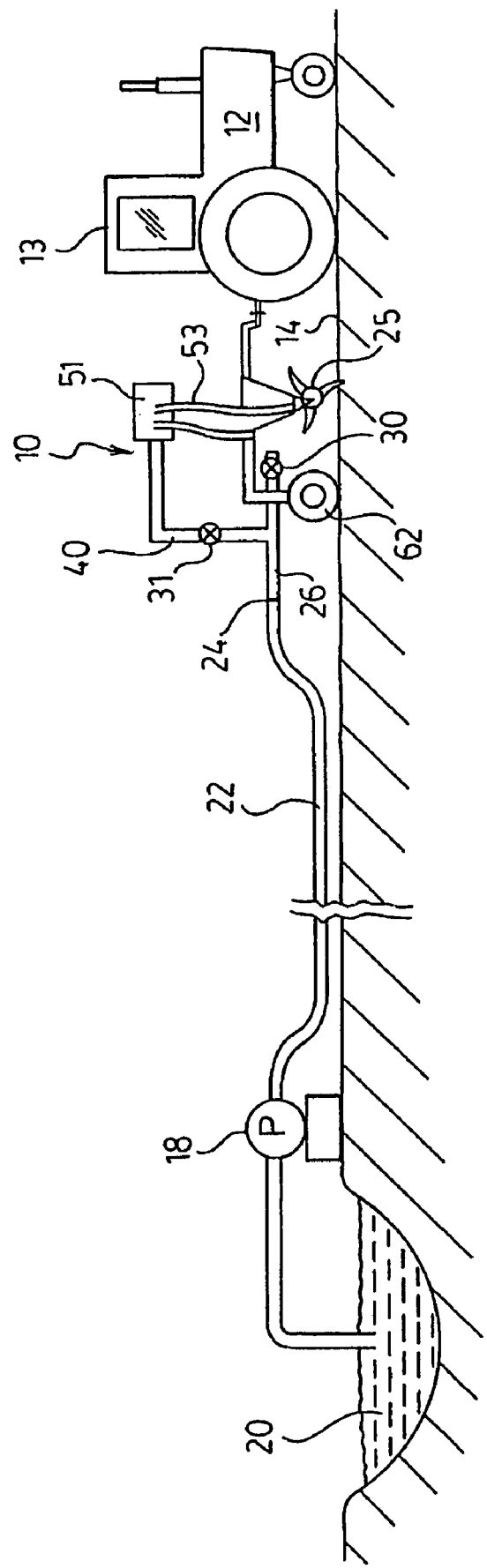
FIG. 2 is a view along arrow "A" of FIG. 2.
Figure 3:
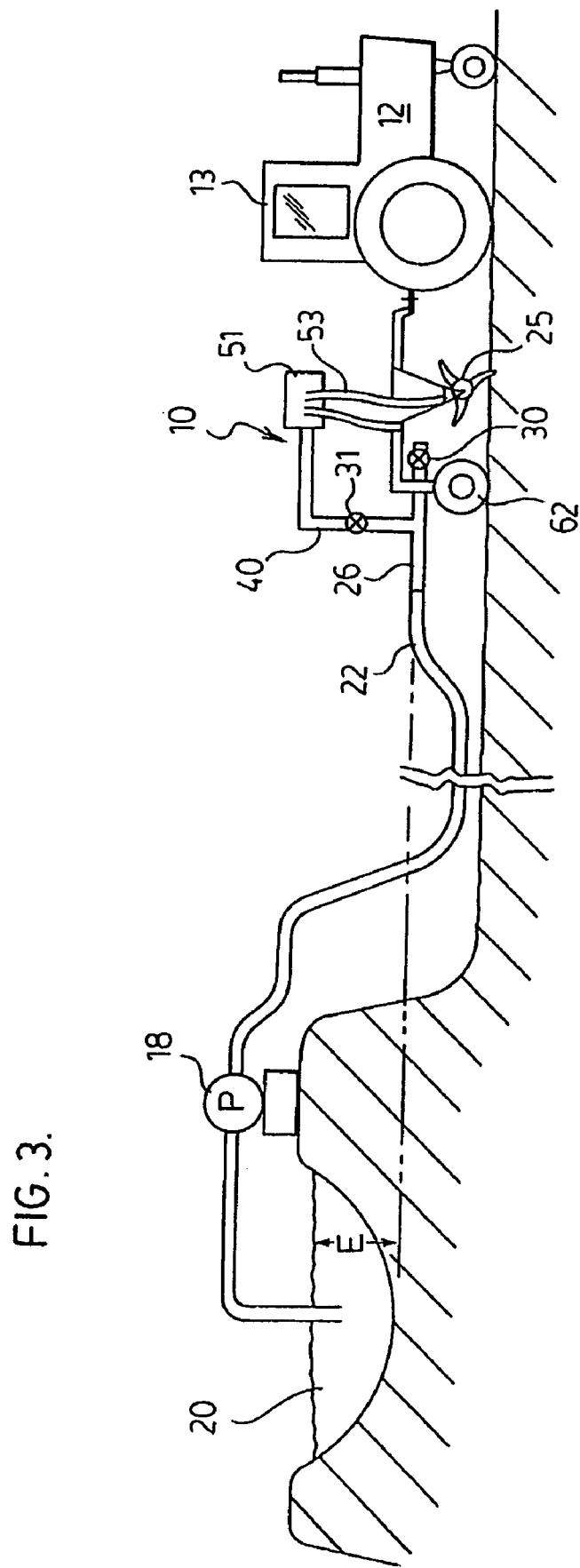
FIG. 3 is a view similar to that shown in FIG. 2, wherein the lagoon for supply of liquid-solid dispersions is at a higher elevation than the apparatus of the present invention.

FIGS. 1-3 show an applicator apparatus 10 of the present invention, adapted to be towed by a tractor 12 over land 14 to which a liquid or liquid solid dispersion is desired to be applied.

As seen from FIGS. 1-3, a liquid or liquid solid dispersion 16, typically contained in a lagoon 20, may be pumped via pump 18 into a flexible supply hose 22, typically of pvc plastic or woven fabric.

Such supply hose 22 is releasibly connected to applicator apparatus 10 via a releasable fluid coupling 24. Such releasable coupling may be any of the type common in the art.

In practice, applicator apparatus 10 is typically towed in serpentine fashion over land 14 to consistently apply the liquid or liquid solid dispersion to the tract of land 14.

Alternatively, the source of liquid solid dispersion, instead of being a storage lagoon 20, may be an elevated tank (not shown), which may be situated in a fixed position, or which may be mounted on wheels and towed by the tractor 12 along with applicator apparatus 10, to serve as a mobile source of supply of liquid or liquid-solid dispersion.

In a preferred embodiment the applicator apparatus 10 comprises a frame 61 and a plurality of gangs of tined rollers 25, which assist in mixing soil with the liquid solid dispersion, or alternatively burying the liquid-solid dispersion beneath a layer of soil in a technique known as sub-surface deposition, which assists in ensuring seeds and/or crops are best able to come into contact with the liquid solid dispersion which supplies nutrients thereto, and in the case of applying liquid manure as the liquid-solid dispersion, assists in preventing unwanted odours emanating from the tracts of land 14 to which such liquid solid dispersions have been applied.

As shown in FIG. 2, lagoon 20 may have liquid solid dispersion therein at approximately the same vertical level as the soil/land 14 to which the liquid solid dispersion may be applied.

Alternatively, as shown in FIG. 3, lagoon 20 may be elevated by a distance "E" relative to the level of the applicator apparatus and the land 14 to which the liquid-solid dispersion may be applied.

Applicator apparatus 10, in a preferred embodiment thereof having a first valve 30 and second valve 31, is shown in detail in FIGS. 4-7 inclusive. Reference is herein made to these figures below.

A substantially linear, elongate conduit 26 is provided on applicator apparatus 10.

Figure 4:
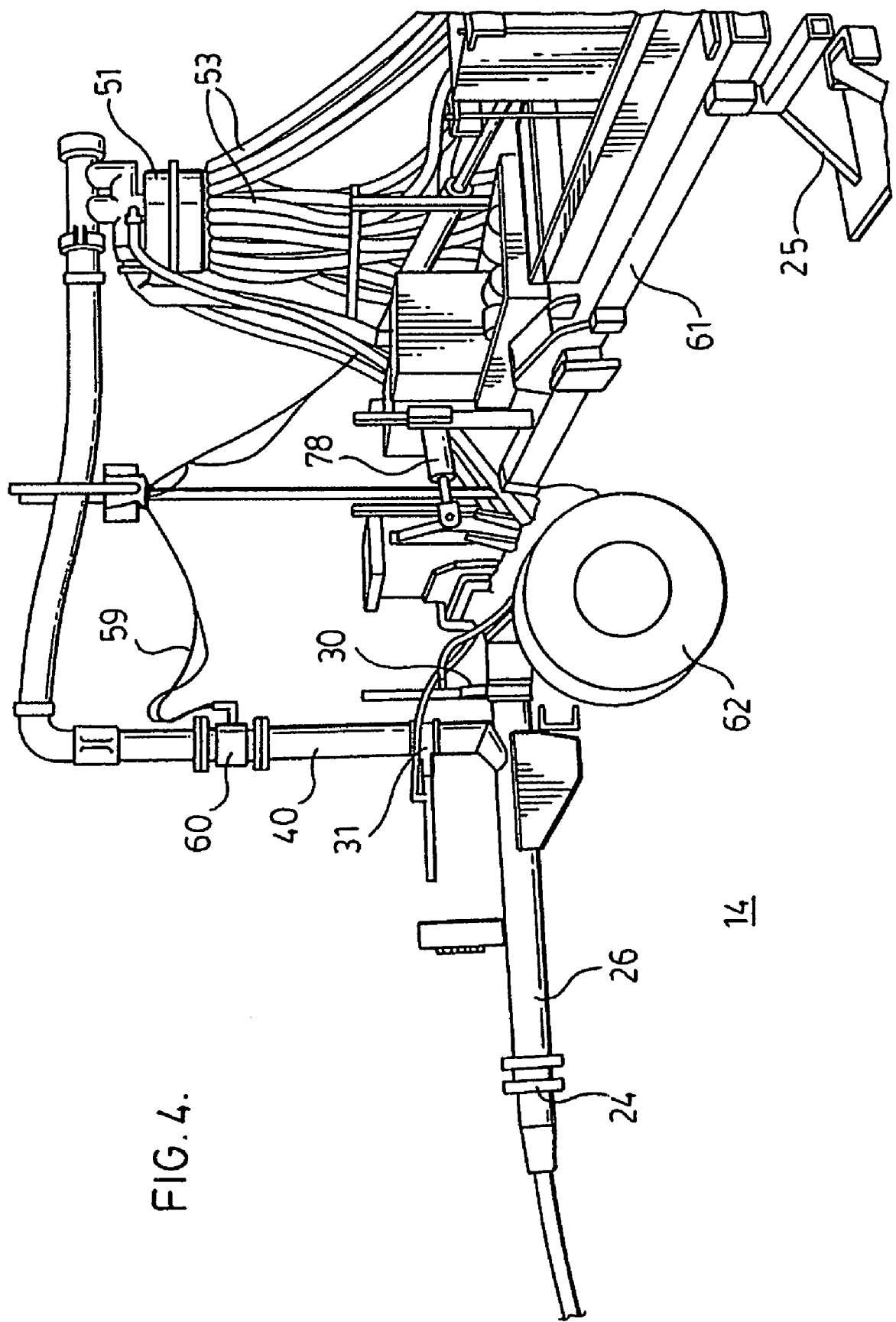
FIG. 4 is a partial right side elevation view of the apparatus of the present invention.
Figure 5:
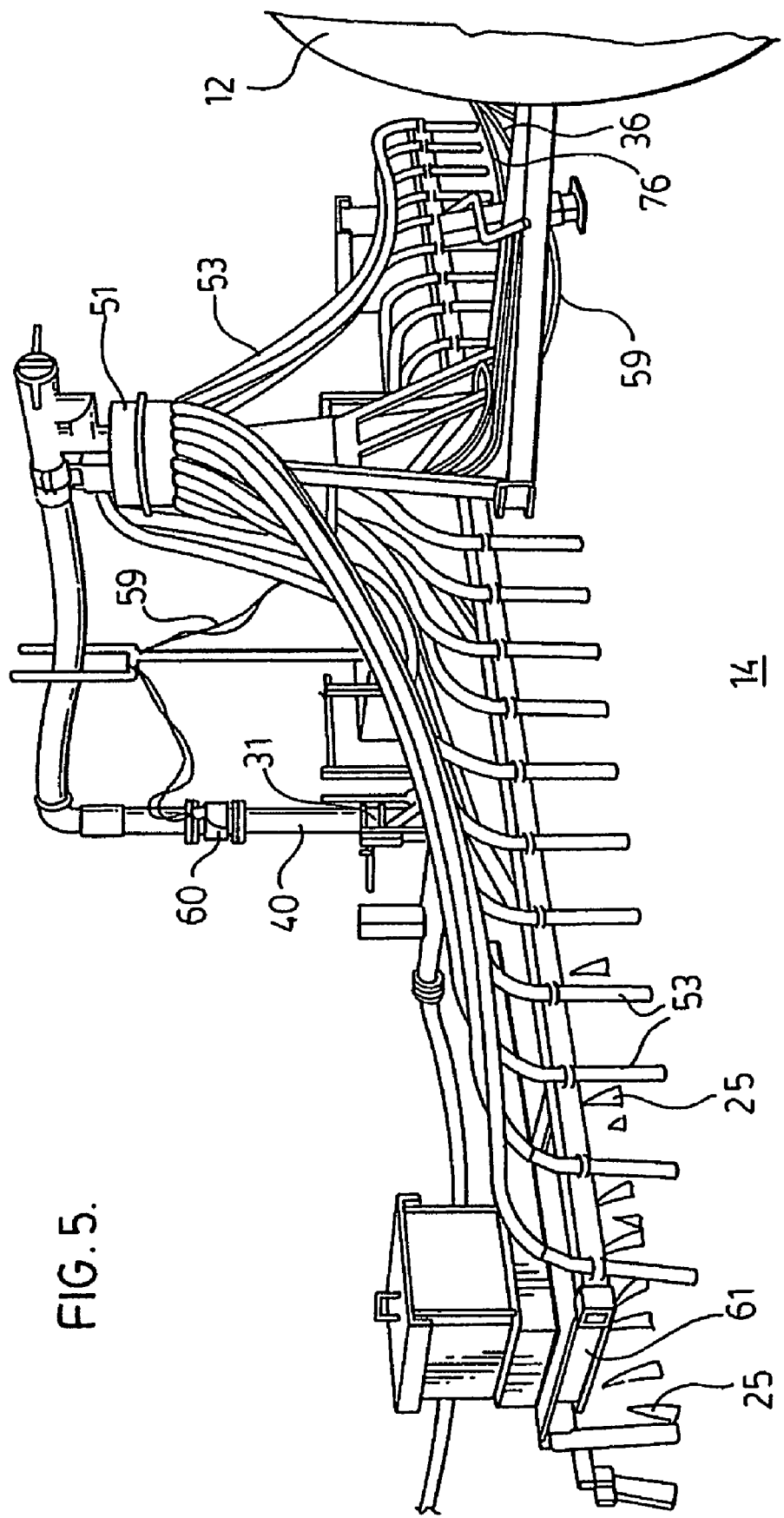
FIG. 5 is a right side perspective view of the apparatus of the present invention, looking rearwardly.
Figure 6:
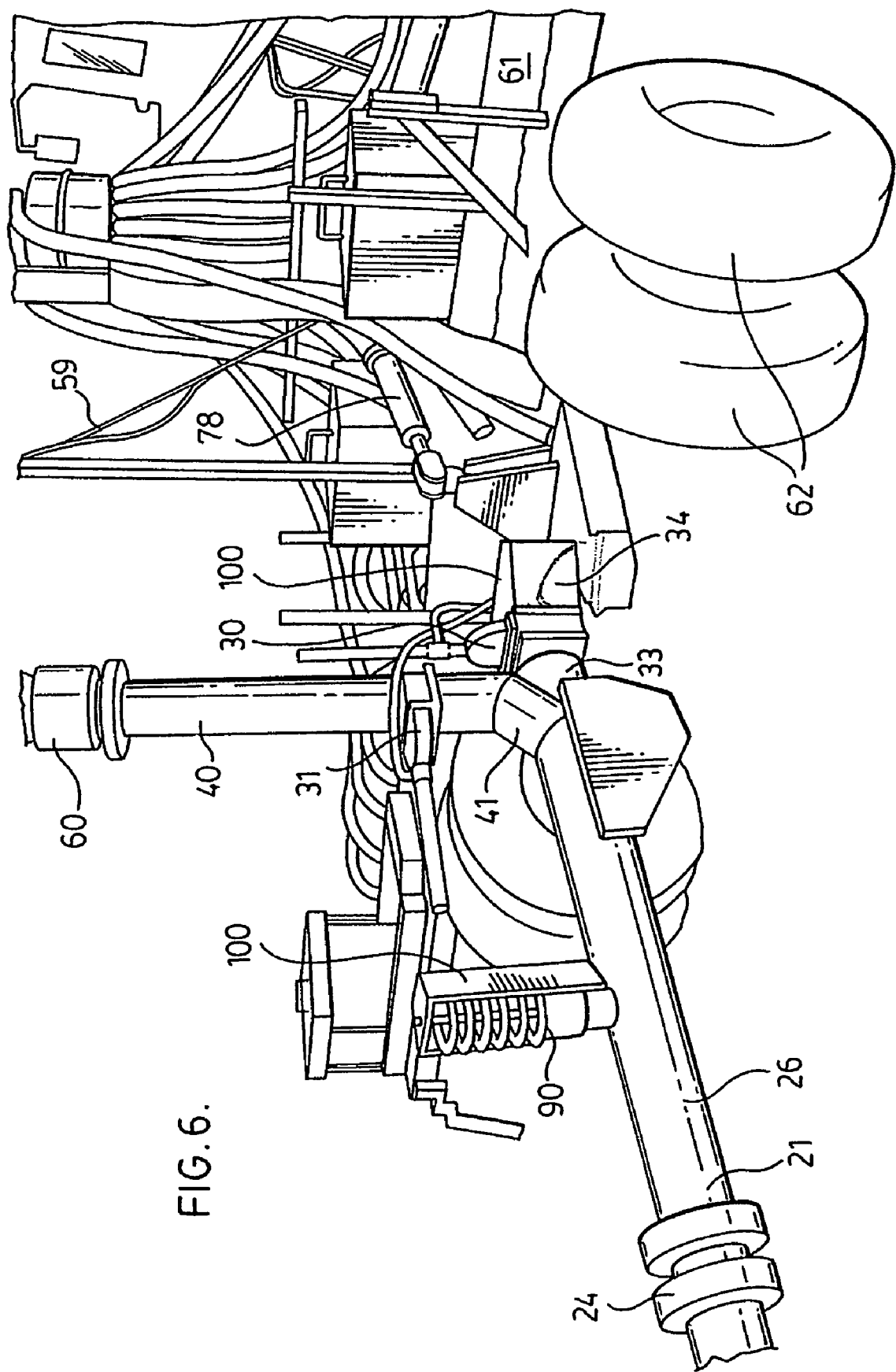
FIG. 6 is a right side perspective view of the apparatus of the present invention, showing a detail view of the conduit means, looking forwardly.
Figure 7:
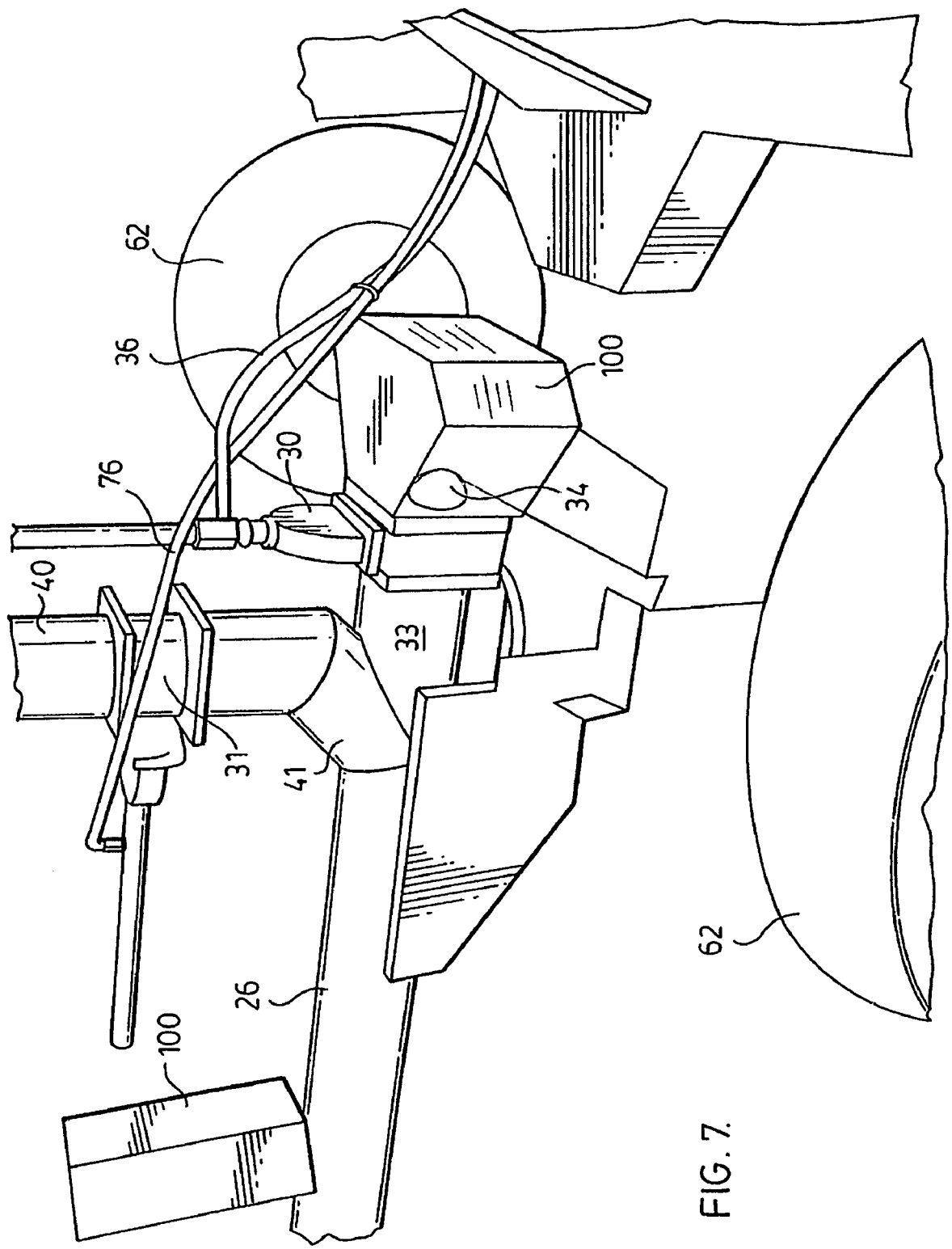
FIG. 7 is a detailed view of the first valve means, aperture, and proximal end of the conduit means, and the second valve means and the outwardly extending conduit.

As best seen from FIG. 4 & 6, elongate conduit 26 is situate low on apparatus 10. Elongate conduit 26 possesses a distal end 27, and is typically a cylindrical steel conduit of 6" nominal outside diameter, to which a flexible supply hose 22 may be releasibly fluidly coupled by means of releasable fluid coupling 24.

Elongate conduit 26 at an opposite proximal end 33 thereof possesses an aperture 34. The first valve 30 is situate proximate aperture 34. In the embodiment shown, first valve 30 is a hydraulically operated knife valve, actuated by hydraulic line 36. First valve 30 is capable of being opened to substantially the interior diameter of conduit 30, to permit egress of a pig member (not shown) via aperture 34 when said first valve 30 is opened.

An outwardly extending conduit 40 is provided, a first end 41 thereof in fluid communication with conduit 26 intermediate said proximal end 33 and distal end 27 thereof. Conduit 40 extends upwardly from conduit 26, and at its other end 50 is in fluid communication with raised manifold 51. From raised manifold 51 downwardly extend a plurality of supply tubes 53 which are adapted to supply liquid solid dispersion to land 14 at various points along apparatus 10 and in front of gangs of tined rollers 25.

A flow meter 60 may be incorporated in upwardly extending conduit 40 to monitor the rate of delivery of liquid solid dispersion to applicator apparatus 10. Output from flow meter 60 is monitored at the cab of tractor 12 via electrical monitoring wires 59.

Frame 61 of apparatus 10 is coupled to pneumatic air-filled tires 62 to support frame 61 of applicator apparatus 10 as it is towed by tractor 12 over land 14. Preferably, tires 62 are relatively wide to avoid applicator apparatus sinking to any great extent in relatively moist soil conditions, as is commonly encountered in spring seeding and fertilizing operations, and as typically encountered when applying a liquid-solid dispersion to soil and mixing it therewith via gangs of tined rollers 25. Frame 61 and gangs of tined rollers 25 may be raised by means of hydraulically powered cylinder 78 to permit tires 62 to be the sole ground engagement of applicator apparatus 10, to permit transport of applicator apparatus 10 over commercial roadways. When operation of the applicator apparatus 10 is desired to be resumed, frame 61 and gangs of tined rollers 25 are lowered to permit engagement of rollers 25 with the soil.

Second valve 31 is, in the form shown, a hydraulically operated knife gate valve similar to first valve 30, both manufactured by Metaltechnica of Italy, and each remotely and separably controllable from the cab 13 of tractor 12, valve 31 being situated in upwardly extending conduit 40 proximate the point of juncture to conduit 26. Like first valve 30, second valve 31 is an automated hydraulically controlled valve controlled via hydraulic supply lines 76 from the cab 13 of tractor 12. One such automated hydraulically controlled knife valve suitable for such purpose is a 6 inch diameter hydraulic knife gate valve made by Metaltechnica of Italy, but other satisfactory types of valves, such as electrically-controlled solenoid valves, will be readily apparent to persons of skill in the art.

A spring-biased pressure relief valve 90 is provided, mounted on conduit 26, to protect manifold 51 and supply tubes 53 in the event of exposure to excess pressure being supplied by flexible supply hose 22.

Deflector plates 100 are provided at pressure relief valve 90, and aperture 34, to direct any released matter in a desired direction.

The above-described configuration for applicator apparatus 16, in addition to providing drainage of any residual liquid-solid dispersions remaining in applicator apparatus 10 after cessation of operation and decoupling from flexible supply hose 22, advantageously permits two types of cleaning operations to avoid plugging problems prevalent in the prior art.

The first cleaning procedure involves a pigging operation, which is permitted to be carried out when the applicator apparatus 10 remains coupled to the supply hose 22. Firstly, when flexible supply hose 22 is coupled to applicator apparatus 10 via fluid coupling 24, and a pig member (not shown) is forced through supply hose 22, typically by compressed air, first valve 30 may be opened, and second valve 31 closed, and pig member thereby permitted to pass through conduit 26, first valve 30, and thus exit conduit 26 via aperture 34. In such manner all of supply hose 22 and conduit 26 may be purged by the pig member of accumulated fibrous solid matter which may accumulate on the inner periphery of supply hose 22 and conduit 26 after extensive operation, without having to decouple flexible supply hose 22 from conduit 26.

First valve 30 may thereafter be closed, and second valve 31 be opened, to permit high pressure air to be directed through each of manifold 51 and supply tubes 53 thereby purging them of any accumulated solid matter.

Upon re-supply of solid-liquid dispersion to applicator apparatus 10 via supply hose 22, a second cleaning operation may be conducted to overcome plugging encountered due to the dehydration phenomenon described above.

In such second cleaning operation, first valve 30 may once again be opened, and second valve 31 closed, to allow discharge of the initial dehydrated "plug" of solid matter which will initially be supplied to the applicator apparatus 10 via flexible supply hose 22, via aperture 34. Deflector plate 100, situate proximate aperture 34, direct such fibrous plug, and any following liquid solid dispersion, outwardly. Thereafter, second valve 31 is opened, and first valve 30 closed, to permit supply of liquid solid dispersion to manifold 51 and thence to supply tubes 53 and thereafter to the soil, permitting operation of applicator apparatus 10 to resume in the intended manner.

Although the disclosure described and illustrates preferred embodiments of the invention, it is to be understood that the invention is not limited to these particular embodiments. Many variations and modifications will now occur to those skilled in the art. For a complete definition of the invention and its intended scope, reference is to be made to the summary of the invention and the appended claims read together with and considered with the disclosure and drawings herein.

I claim:

1. An apparatus for applying a liquid or a liquid-solid dispersion to soil when passed over said soil, comprising:

a substantially linear elongate conduit having a distal and a proximal end, adapted at said distal end for releasable coupling to a supply hose for receiving said liquid or liquid-solid dispersion, and having at said proximal end an aperture;

first valve means, situate proximate said proximal end of said elongate conduit, adapted to permit egress of a pig member via said aperture when said first valve means is opened;

an outwardly-extending conduit, one end thereof in fluid communication with and fluidly coupled to said elongate conduit intermediate said proximal and distal end thereof; and at another end in fluid communication with a manifold member;

a plurality of supply tubes, each in fluid communication at one end thereof with said manifold member and at another end thereof adapted to supply said liquid or liquid-solid dispersion to soil; and wherein said first valve means may be opened to permit passage of said pig member through said elongate conduit from said distal end to said proximal end and egress via said aperture, and wherein said first valve means may thereafter be closed to permit said liquid or liquid-solid dispersion to be supplied from said elongate conduit to said outwardly-extending conduit and thereafter to said manifold member for delivery to said soil when said apparatus is passed over said soil.

2. The apparatus as claimed in claim 1 wherein said first valve means comprises a remotely-operable valve member selected from the group of remotely operable valve members comprising hydraulically operated valve members, electrically-operated valve members, or solenoid operated valve members.

3. The apparatus as claimed in claim 1, further possessing second valve means situate in said outwardly-extending conduit proximate said one end thereof, for preventing, when closed, ingress of said liquid-solid dispersion to said manifold member, and when opened, permitting flow of said liquid or liquid-solid dispersion to said manifold member.

4. The apparatus as claimed in claim 3 wherein said second valve means when closed further prevents passage of said pig member to said manifold member.

5. An apparatus for applying a liquid or a liquid-solid dispersion to soil when passed over said soil, comprising:

an elongate conduit having a distal and a proximal end, adapted at said distal end for releasable coupling to a supply hose for receiving said liquid or liquid-solid dispersion, and having at said proximal end an aperture;

first valve means, situate proximate said proximal end of said elongate conduit, adapted to permit egress of said liquid or liquid-solid dispersion via said aperture when said first valve means is opened;

an outwardly extending conduit, one end thereof in fluid communication with and fluidly coupled to said elongate conduit intermediate said proximal and distal end thereof and at another end in fluid communication with a manifold member;

a plurality of supply tubes, each in fluid communication at one end thereof with said manifold member and at another end thereof adapted to supply said liquid or liquid-solid dispersion to soil; and second valve means, situate in said outwardly extending conduit proximate said one end thereof, for preventing, when closed, ingress or egress of said liquid or liquid-solid dispersion to or from said manifold member, and when opened, permitting flow of said liquid or liquid-solid dispersion to said manifold member;

wherein said first valve means may be opened and said second valve means may be closed to permit an initial portion of said liquid or liquid-solid dispersion to be passed through said elongate conduit from said distal end to said proximal end and ejected via said aperture; and wherein said first valve means may thereafter be closed and said second valve means opened to permit said liquid or liquid-solid dispersion to be supplied from said elongate conduit to said outwardly extending conduit and thereafter to said manifold member for delivery to said soil when said apparatus is passed over said soil.

6. The apparatus as claimed in claim 5, wherein said first valve means is further adapted to permit egress of a pig member via said aperture when said first valve is opened.

7. The apparatus as claimed in claim 3 or 5 wherein each of said first and second valve means each comprise a remotely-operable valve member selected from the group of remotely operable valve members comprising hydraulically operated valve members, electrically-operated valve members, or solenoid operated valve members.

8. The apparatus as claimed in claim 3 or 5 wherein said second valve means is a remotely-operated valve selected from the group of remotely operated valves consisting of hydraulically operated valves, electrically-operated valve members, or solenoid operated valves, and said second valve means is biased in a closed position when in a non-activated state.

9. An apparatus for applying a liquid or a liquid-solid dispersion to soil when passed over said soil, comprising:

an elongate substantially linear conduit, located low on the apparatus and proximate said soil over which said apparatus is passed, having a distal and a proximal end, adapted at said distal end for releasable coupling to a supply hose for receiving said liquid or liquid-solid dispersion, and having at said proximal end an aperture;

first valve means, situate close to said proximal end of said elongate conduit, adapted to permit egress of a pig member via said aperture when said first valve means is opened;

an outwardly and upwardly extending conduit, one lower end thereof in fluid communication with and fluidly coupled to said elongate conduit intermediate said proximal and distal end thereof; and at another raised end in fluid communication with an elevated manifold member;

a plurality of supply tubes, each in fluid communication at one raised end thereof with said manifold member and at another lower end thereof situate proximate said soil and adapted to supply said liquid or liquid-solid dispersion to said soil; and wherein said first valve means may be opened to permit passage of said pig member through said elongate conduit from said distal end to said proximal end and to be ejected via said aperture; and wherein said first valve means may thereafter be closed to permit said liquid or liquid-solid dispersion to be supplied from said elongate conduit to said outwardly extending conduit and thereafter to said manifold member for delivery to said soil when said apparatus is passed over said soil.

10. An apparatus for applying a liquid or a liquid-solid dispersion to soil when passed over said soil, comprising:

an elongate, substantially linear conduit, located on the apparatus proximate said soil over which said apparatus is passed, having a distal and a proximal end, adapted at said distal end for releasable coupling to a supply hose for receiving said liquid or liquid-solid dispersion, and having at said proximal end an aperture;

first valve means, situate close to said proximal end of said elongate conduit, adapted to permit egress of said liquid or liquid-solid dispersion via said aperture when said first valve means is opened;

an outwardly and upwardly extending conduit, one lower end thereof in fluid communication with and fluidly coupled to said elongate conduit intermediate said proximal and distal end thereof; and at another elevated end in fluid communication with an elevated manifold member;

a plurality of supply tubes, each in fluid communication at one raised end thereof with said manifold member and at another end thereof situate proximate said soil and adapted to supply said liquid or liquid-solid dispersion to said soil; and second valve means, situate in said outwardly extending conduit for preventing, when closed, ingress or egress of said liquid or liquid-solid dispersion to or from said manifold member, and when opened, permitting flow of said liquid or liquid-solid dispersion to said elevated manifold member;

wherein said first valve means may be opened and said second valve means may be closed to permit an initial portion of said liquid or liquid-solid dispersion to be passed through said elongate conduit from said distal end to said proximal end and ejected via said aperture; and wherein said first valve means may thereafter be closed and said second valve means opened to permit said liquid or liquid-solid dispersion to be supplied from said elongate conduit to said outwardly extending conduit and thereafter to said manifold member for delivery to said soil when said apparatus is passed over said soil.

11. The apparatus as claimed in claim 10, wherein said first valve means is further adapted to permit egress of a pig member via said aperture when said first valve is opened.

12. The apparatus as claimed in claim 9, 10 or 11, wherein said elongate conduit is inclined to the horizontal.

13. The apparatus as claimed in claim 1, 3, 5, 9 or 10 further possessing pressure relief valve means to prevent over-pressurization of said manifold member and said supply hoses.

14. The apparatus as claimed in claim 1, 3, 5, 9 or 10 further possessing pressure relief valve means to prevent over-pressurization of said manifold member and said supply tubes; and
wherein said pressure relief valve means is situate on said elongate conduit so as to relieve said supply tubes of excess pressure in the event said elongate conduit is in a state of over-pressurization.

15. The apparatus as claimed in claim 1, 3, 5, 9 or 10 further possessing pressure relief valve means to prevent over-pressurization of said manifold member and said supply tubes, and wherein either of said first valve means or said second valve means further comprise and have integrated therein said pressure relief valve means.

16. The apparatus as claimed in claim 1, 3, 5, 9 or 10 further possessing deflector means to direct matter which may egress said aperture.

17. The apparatus as claimed in claim 1, 3, 5, 9 or 10 wherein said elongate conduit further possesses pressure relief valve means to prevent over-pressurization of said manifold member and said supply tubes, further possessing deflector means to direct matter which may egress said pressure relief valve means.

18. A method of operating an apparatus as claimed in claims 1, 3, 5, 9, or 10.

19. A method of cleaning an apparatus adapted to apply a liquid or liquid-solid dispersion to soil, said apparatus comprising:

a substantially linear elongate conduit having a distal and a proximal end, adapted at said distal end for releasable coupling to a supply hose for receiving said liquid or liquid-solid dispersion, and having at said proximal end an aperture;

first valve means, situate proximate said proximal end of said elongate conduit, adapted to permit egress of a pig member via said aperture when said first valve means is opened;

an outwardly-extending conduit, one end thereof in fluid communication with and fluidly coupled to said elongate conduit intermediate said proximal and distal end thereof; and at another end in fluid communication with a manifold member;

a plurality of supply tubes, each in fluid communication at one end thereof with said manifold member and at another end thereof adapted to supply said liquid or liquid-solid dispersion to soil;

second valve means situate in said outwardly-extending conduit proximate said one end thereof, for preventing, when closed, ingress of said liquid-solid dispersion to said manifold member, and when opened, permitting flow of said liquid or liquid-solid dispersion to said manifold member;

said method comprising the steps of:

(i) closing said second valve means;
(ii) opening said first valve means;
(iii) forcing said pig member through said elongate conduit from said distal end to said proximal end and ejecting same from said apparatus via said aperture;
(iv) opening said second valve means and closing said first valve means; and
(v) allowing air or cleaning fluid supplied to said conduit to flow into said manifold member and thereafter to said supply tubes so as to eject from said apparatus any remaining liquid dispersion or liquid-solid dispersion.

20. A method of operating an apparatus for applying a liquid or liquid-solid dispersion to soil, said apparatus comprising:

a substantially linear elongate conduit having a distal and a proximal end, adapted at said distal end for releasable coupling to a supply hose for receiving said liquid or liquid-solid dispersion, and having at said proximal end an aperture;

first valve means, situate proximate said proximal end of said elongate conduit;

an outwardly-extending conduit, one end thereof in fluid communication with and fluidly coupled to said elongate conduit intermediate said proximal and distal end thereof, and at another end in fluid communication with a manifold member;

second valve means situate in said outwardly-extending conduit proximate said one end thereof, for preventing, when closed, ingress of said liquid-solid dispersion to said manifold member, and when opened, permitting flow of said liquid or liquid-solid dispersion to said manifold member;

a plurality of supply tubes, each in fluid communication at one end thereof with said manifold member and at another end thereof adapted to supply said liquid or liquid-solid dispersion to soil;

said method comprising the steps of:

(i) closing said second valve means;
(ii) opening said first valve means;
(iii) directing an initial liquid or liquid/solid dispersion through said elongate conduit from said distal end thereof to said proximal end;
(iv) ejecting an initial portion of said dispersion from said elongate conduit via said aperture;

(v) closing said first valve means and opening said second valve means; and (vi) permitting said liquid or liquid-solid dispersion to pass through said second valve means and thereafter to said manifold of said apparatus.

21. A method of cleaning an apparatus adapted to apply a liquid or liquid-solid dispersion to soil, said apparatus comprising:

a substantially linear elongate conduit having a distal and a proximal end, adapted at said distal end for releasable coupling to a supply hose for receiving said liquid or liquid-solid dispersion, and having at said proximal end an aperture;

first valve means, situate proximate said proximal end of said elongate conduit, adapted to permit egress of a pig member via said aperture when said first valve means is opened, wherein said first valve means is a remotely operated valve means capable of being remotely actuated from a tractor adapted to tow said apparatus, selected from the group of remotely operated valves consisting of hydraulically-operated, electrically-operated, and solenoid-operated valves;

an outwardly-extending conduit, one end thereof in fluid communication with and fluidly coupled to said elongate conduit intermediate said proximal and distal end thereof, and at another end in fluid communication with a manifold member;

a plurality of supply tubes, each in fluid communication at one end thereof with said manifold member and at another end thereof adapted to supply said liquid or liquid-solid dispersion to soil;

said method comprising the steps of:

(i) opening said first valve means so as to allow egress of matter from said aperture;

(ii) forcing said pig member through said elongate conduit from said distal end to said proximal end; and (iii) ejecting said pig member from said apparatus via said aperture.

* * * * *